Figure 1:
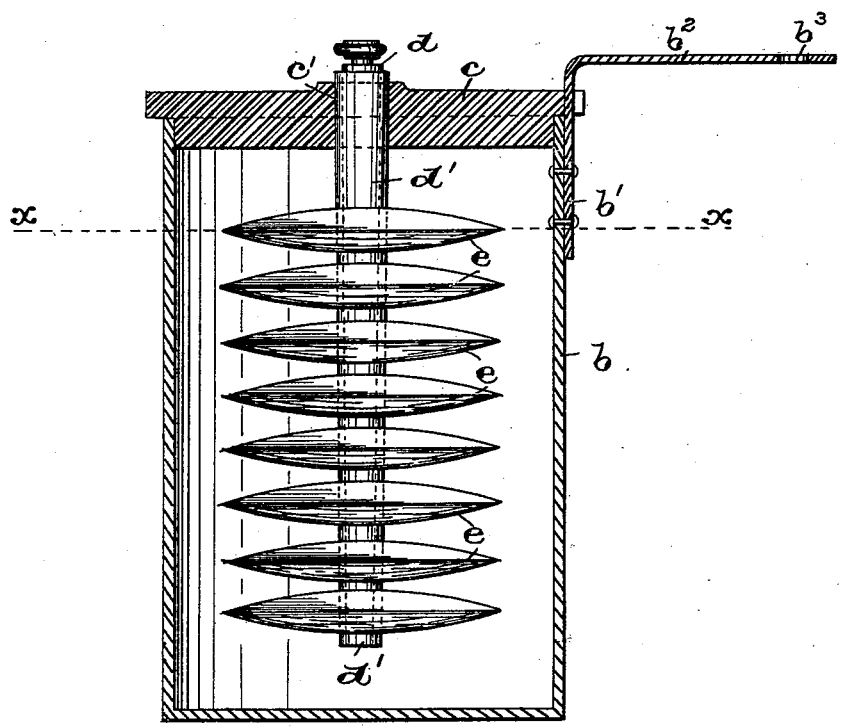

No. 645,261. Patented Mar. 13, 1900.
F. K. IRVING.
BATTERY ELECTRODE.
(Application filed May 2, 1899.)
(No Model.) 2 Sheets—Sheet 1.

WITNESSES:

INVENTOR:
FRANK K. IRVING,
BY
Fred C. Fraentzel,
ATTORNEY

THE NORRIS PETERS CO., PHOTO-LITHO., WASHINGTON, D. C.

No. 645,261. Patented Mar. 13, 1900.
F. K. IRVING.
BATTERY ELECTRODE.
(Application filed May 2, 1899.)
(No Model.) 2 Sheets—Sheet 2.

WITNESSES:
Wm. H Canfield Jr
Walter H. Talmage.

INVENTOR:
FRANK K. IRVING,
BY
Fred K. Fraentzel,
ATTORNEY

UNITED STATES PATENT OFFICE.

FRANK K. IRVING, OF NEWARK, NEW JERSEY, ASSIGNOR OF ONE-HALF TO ANDREW G. VOGT, OF SAME PLACE.

BATTERY-ELECTRODE.

SPECIFICATION forming part of Letters Patent No. 645,261, dated March 13, 1900.

Application filed May 2, 1899. Serial No. 715,312. (No model.)

*To all whom it may concern:*

Be it known that I, FRANK K. IRVING, a citizen of the United States, residing at Newark, in the county of Essex and State of New Jersey, have invented certain new and useful Improvements in Battery-Electrodes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The purpose of my present invention is to produce a cheap and more durable element or plate for batteries such as are used more especially for motive and lighting purposes or for the propulsion of boats, cars, vehicles, and the like, where lightness, compactness, high potential, &c., are of prime importance.

A further object of this invention is to provide a battery plate or element which shall be lighter, more compact, less complicated, and more powerful than those now in general use and which at the same time shall possess great durability and may be charged by a continuous current in one direction and not require any reversals of currents to form plates, as in other systems.

With these several ends in view my invention consists in making an alloy plate composed of lead, zinc, and mercury, said plate to be cast or pressed into disks, rods, pans, or plates and to be immersed in an electrolytic solution together with a metal of opposite polarity, substantially as will be hereinafter fully set forth, and finally embodied in the claim.

In carrying out my invention the battery plate or element consists of a composition of matter or alloy which is prepared by first taking five pounds of lead-shavings and twelve ounces of mercury, the same being mixed, then melted together, and allowed to cool. After this molten mass has cooled sufficiently the compound is broken up and mixed with zinc in the proportion of one part of the zinc to six parts of the lead and mercury compound and the whole matter melted. The resultant alloy may be cast, rolled, molded, or pressed into any suitable shape, as may be desired.

From the above statement one might suppose that the mercury, having a low point of volatilization, would pass off before the other metals melt; but such is not the case where the several metals are mixed in the manner hereinabove stated. The above mixture also enables me to combine more of the zinc with the lead, which ordinarily would take up only a trace of the zinc in melting and leave the rest floating upon the molten surface of the lead.

Of course it will be understood that the hereinabove-stated proportions may be varied; but I find the proportions herein given to produce the most satisfactory results.

By the employment of this composition of matter or alloy plate I am enabled to secure an element for a battery which has the following action: For sake of illustration say that one element is composed of a single plate immersed in a solution of sulfuric acid, 30° Baumé, together with a copper pole or strip. Upon the introduction of a charging-current the zinc and mercury, being transferable by electrolysis and also being soluble in the solution of sulfuric acid, are deposited or plated upon the copper plate. The electrolytic oxygen attacks the remaining porous lead plate or plates or disks and forms peroxid of lead. By the dissolution of the alloy plate I have a spongy porous lead plate left, and I deposit the metal necessary to form the opposite pole therefrom, thus giving me a lead-peroxid-zinc-mercury alloy combination which will produce an electromotive force of two and one-half volts.

In the drawings accompanying this specification I have illustrated two constructions of batteries in which I employ my novel form of battery-plate.

Figure 2:
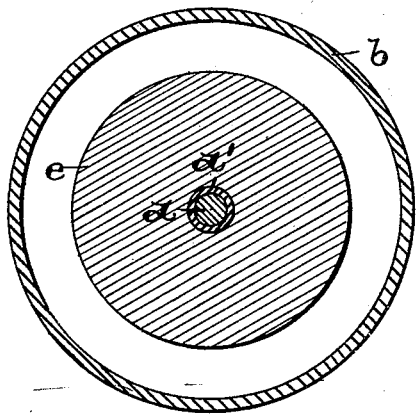
Figure 3:
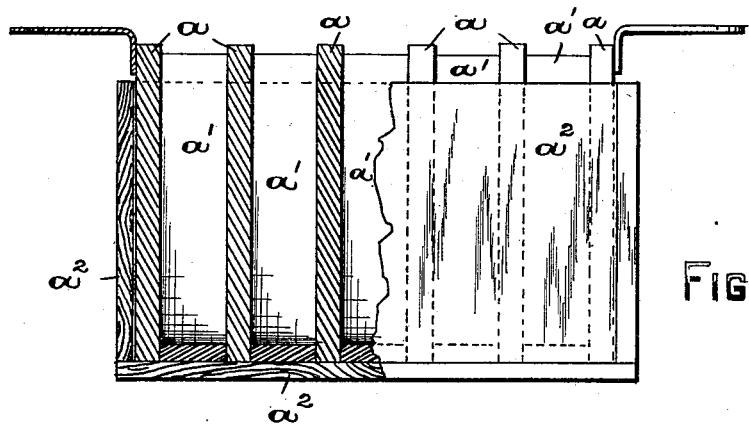
Figure 4:
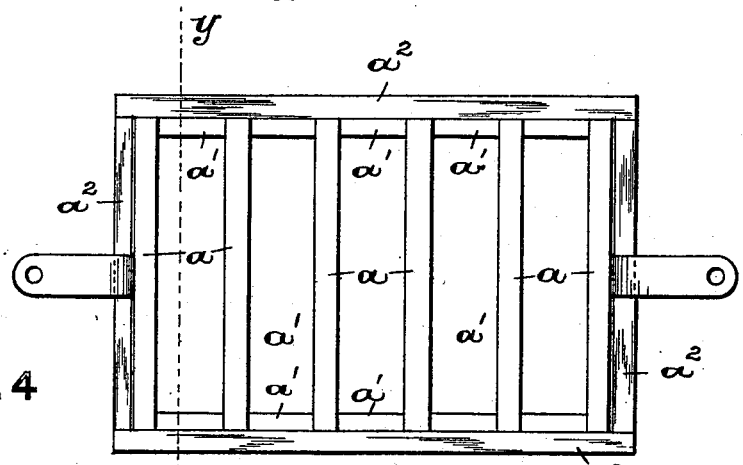

In said drawings, Figure 1 is a vertical section, and Fig. 2 a horizontal section taken on line $x$ in Fig. 1, of one form of battery, in which my novel plates are made disk-shaped. Fig. 3 is a part side elevation and part longitudinal vertical section of another form of battery provided with plates made according to my present invention. Fig. 4 is a plan or top view of said form of battery; and Fig. 5 is a vertical cross-section of the same, taken on line $y$ in said Fig. 4.

In Figs. 1 and 2 of the drawings, $b$ indicates the cell of the battery, the same being made of copper to provide the positive electrode of the battery, said cell having a copper contact-piece $b'$, which has a part $b^2$, bent at a right angle, or approximately so, in which there is a hole $b^3$ for connecting said cell in circuit with the pole-piece $d$ of another cell. The said cell $b$ is provided with a cover $c$, of a non-conducting material, and has a hole $c'$, in which is secured in any suitable manner a rod $d$, provided with a piece of lead tubing or covering $d'$. Upon this support thus provided I have arranged the disks $e$, which form the negative elements of this battery and are made of the alloy hereinabove mentioned.

Figure 5:
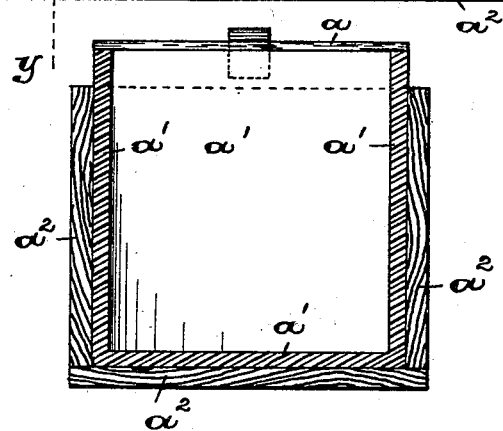

In the construction of battery represented in Figs. 3, 4, and 5, $a$ indicates the alloy plates, built up on two sides and the bottom with insulators $a'$, the spaces between the plates $a$ being filled with the electrolytic solution. Said plates $a$ and the insulators $a'$ are arranged in a suitable casing $a^2$, of wood or any other non-conducting material.

Having thus described my invention, what I claim is—

The herein-described plate or element for a battery, composed of lead and mercury, in the proportion of five pounds of lead to twelve ounces of mercury, and zinc, in the proportion of one part of zinc to six parts of the lead and mercury compound, substantially as and for the purposes set forth.

In testimony that I claim the invention set forth above I have hereunto set my hand this 29th day of April, 1899.

FRANK K. IRVING.

Witnesses:
FREDK. C. FRAENTZEL,
WALTER H. TALMAGE.